United States Patent [19]
DePaul et al.

[11] Patent Number: 6,083,406
[45] Date of Patent: Jul. 4, 2000

[54] LUBRICATING OIL RECONDITIONING SYSTEM

[75] Inventors: Michael T. DePaul, Fox River Grove; Frank DePaul, Round Lake Park, both of Ill.

[73] Assignee: Marine Oil Technology, Inc., LaJolla, Calif.

[21] Appl. No.: 09/006,310

[22] Filed: Jan. 13, 1998

Related U.S. Application Data

[63] Continuation-in-part of application No. 08/344,287, Nov. 22, 1994, Pat. No. 5,707,515.

[51] Int. Cl.[7] ............................. B01D 17/12; B01D 36/00
[52] U.S. Cl. .......................... 210/742; 210/180; 210/188; 210/295; 210/774; 210/806; 208/187; 219/385; 196/46.1; 184/6.22
[58] Field of Search .............................. 210/97, 120, 149, 210/168, 171, 180, 184, 188, 261, 262, 295, 742, 774, 790, 799, 800, 804, 805, 806; 123/196 A; 196/46, 46.1; 208/187; 96/218, 219; 184/6.22, 6.24; 219/201, 202, 385

[56] References Cited

U.S. PATENT DOCUMENTS

| | | | |
|---|---|---|---|
| 2,001,857 | 5/1935 | Watson ..................................... | 210/180 |
| 2,068,473 | 1/1937 | Schwalge ................................. | 210/180 |
| 2,219,101 | 10/1940 | Finwall . | |
| 2,346,042 | 4/1944 | Morris ..................................... | 210/180 |
| 2,635,759 | 4/1953 | Schwalge ................................. | 210/180 |
| 2,785,109 | 3/1957 | Schwalge ................................. | 210/180 |
| 2,909,284 | 10/1959 | Watkins ................................... | 210/95 |
| 3,356,182 | 12/1967 | Robinson et al. . | |
| 3,392,803 | 7/1968 | Robinson et al. . | |
| 3,616,885 | 11/1971 | Priest ...................................... | 210/180 |
| 3,845,751 | 11/1974 | Runstetler ............................ | 123/196 A |
| 3,956,071 | 5/1976 | O'Brien . | |
| 4,261,838 | 4/1981 | Halleron .................................. | 210/774 |
| 4,295,966 | 10/1981 | LeBlanc et al. ......................... | 210/180 |
| 4,338,189 | 7/1982 | Johnson .................................. | 210/180 |
| 4,349,438 | 9/1982 | Sims ....................................... | 210/180 |

FOREIGN PATENT DOCUMENTS

229630 11/1958 Australia .

*Primary Examiner*—Joseph W. Drodge
*Attorney, Agent, or Firm*—Olson & Hierl, Ltd.

[57] ABSTRACT

Apparatus and methods for improved in-line contaminant removal from engine lubricating oil are provided which employ gravity to achieve a desired flow rate of oil. The invention is adapted for use with an existing engine oil lubrication system and continuously processes a side stream that after processing, is returned to the engine oil. During processing, the oil is first filtered and then drained and deposited upon the upper central surface portions of a heated dome whereon the oil forms a thin film from which relatively low boiling volatile impurities (especially water) are rapidly separated in a gaseous state. The gas is vented through a pressure relief valve to the manifold while the recovered reconditioned oil is collected and recycled.

20 Claims, 5 Drawing Sheets

LUBRICATING OIL RECONDITIONING SYSTEM

RELATED APPLICATION

This application is a continuation-in-part of U.S. Ser. No. 08/344,287, filed Nov. 22, 1994, now U.S. Pat. No. 5,707,515.

FIELD OF THE INVENTION

This invention relates to an improved apparatus and methods for the continuous removal of contaminants from the lubricating oil of an operating fuel combusting engine.

BACKGROUND OF THE INVENTION

In fuel combusting engines, particularly those of the internal combustion type using a liquid fuel such as gasoline or diesel oil, it is known that filtering of the circulating lubricating oil does not remove liquid contaminants from the oil. These liquid contaminants substantially comprise relatively low boiling condensates, especially water, whose presence in the oil causes engine corrosion and wear.

Lubricating oil reconditioning systems that remove such liquid contaminants from circulating engine lubricating oil have previously been proposed for use in association with operating fuel combusting engines. Such prior art systems suffer from various disadvantages so that typically they are not energy-efficient, and not highly effective.

For example, in the prior art, a filter assembly is commonly located below a vaporization chamber in an oil heating device, thereby relying on pressure for the oil to enter the chamber. Thus, prior art devices inject oil under pressure into the chamber making it difficult if not impossible to achieve a sustained thin film for impurity vaporization purposes. Additionally, variations in oil pressure due to changes in engine rpm vary the amounts of oil that are input into the chamber further reducing the effectiveness of the device.

Menyhert U.S. Pat. No. 5,198,104, for example, discloses a device for removing volatile components from oil in which the oil is filtered before being subjected to a volatilization procedure using a heated plate with multiple protrusions. However, in such a device, the filter is positioned below the volatilization chamber so that oil accumulates in the filter and is wasted during a filter change.

In Menyhert, a cartridge-type heater is used which characteristically does not distribute heat evenly to the vaporizing surfaces. Also, such a heater must be partially exposed to the outside elements, thereby increasing the likelihood of heater failure due to shorts and corrosion.

Also, although Menyhert alleges that his "walls" maintain a thin film in conjunction with a swivel mount, since oil is fed under pressure into his chamber, it will spray and so the swivel mount is not effective for heavy duty use which requires strong stationary mounts. Also, his swivel mount places undue stresses on the inlet and outlet hoses and fittings. The only vaporizing surface in Menyhert is the centermost wall. The oil pools (collects) in the valleys of the concentric wall members and does not travel in a thin film. Since the oil enters under pressure, the oil, under increased pressure, sprays into the chamber and misses the first vaporizing wall surface. Menyhert cannot maintain a uniform thin oil layer during the volatilization procedure.

In addition, for Menyhert to achieve a correct seal between his oil inlet and filter, the filter and the evaporator plate, and the cap and the outer canister, great effort must be extended to adjust and readjust the tension on the clamps and adjustable threaded center post. This leads to the generally unacceptable result of oil leaking through the seals and not being processed completely.

For another example, in Engel U.S. Pat. No. 4,289,583, a heater post must contact the evaporator plate and transmit heat to the wall surfaces. This is a highly inefficient arrangement. Also, Engel '583 has the same spray introduction and uniform oil volatilization problems as Menyhert and other prior art heated plate pressure fed systems. The techniques taught for connecting and sealing the cap to the outer canister with bolts causes the bolt ears and castings to break under undue stress, thus causing major leaks.

So far as is now known, no one has previously developed a lubricating oil reconditioning system wherein the oil is first filtered and then passed as a thin film over a heated, generally dome-configured platen using gravity as a primary means for controlling oil flow over the platen.

SUMMARY OF THE INVENTION

This invention relates in one aspect to a new and very useful improved process for carrying out in-line contaminant removal, especially the continuous removal of filterable particulates and relatively low boiling liquids, such as water and hydrocarbons, from an oil, particularly a lubricating oil that is being used in an operating internal combustion engine.

By this process, a side stream comprising a minor fraction of the total volume of lubricating oil that is being pumped and circulated in an internal combustion engine from a collecting zone such as the engine oil pan to engine bearing surfaces is continuously separated and charged to a contaminant removal zone. In the contaminant removal zone, the side stream is first filtered preferably at a relatively low flow rate and then is discharged onto the central region of a heated, generally dome-configured heat exchange surface or platen so that the filtrate spreads as a thin fluid film over such surface. Components of the oil film particularly liquid contaminants, that have relatively low boiling points, such as water and hydrocarbons derived from engine fuel, are vaporized and thereby separated therefrom. The resulting oil continuously moves downwards, is collected from about the periphery of the domed surface, and is recirculated and admixed with the engine oil, preferably with engine oil in the engine oil pan.

This invention further relates in another aspect to a new and very useful improved oil reconditioning apparatus for carrying out the inventive contaminant removal process.

This apparatus employs a filter containing assembly and a platen containing assembly. Each assembly is suited for positioning and mounting in the engine compartment of a vehicle. Each assembly is provided with its own associated housing. The subassemblies are interconnected by conduit means. The platen assembly housing encloses upper surface portions of the platen and defines over such portions platen a vapor collecting chamber. A lubricating oil stream to be reconditioned is charged first into the filter. Oil filtrate from the filter flows upon the central portion of the domed platen, moves downwardly thereover as a thin film, collects at the platen periphery and flows downwardly into in a basin from where the collected oil is recirculated. Vapors collecting in the chamber can be recirculated to the engine intake manifold or released through a relief valve when the chamber pressure rises above a preset value or otherwise as desired.

The dome-configured platen is preferably a spherical segment, more preferably a hemispherical shape, but other concavely upwardly curved configurations for the platen can be utilized, if desired, such as a dome configuration with concentric ridges therein.

Optionally, the filtered oil can be sprayed into the vapor collecting chamber. Preferably, the spraying occurs over and above the apex of the dome-configured platen. Thereby, vaporization of contaminants is more efficient.

The filter assembly accomplishes preparation of a freshly prepared filtered oil feed for charging to the platen assembly. A maximized amount of particulates, including sludge and like separatable contaminants, are removed from the oil undergoing reconditioning before that oil is charged to the platen assembly and formed thereon into a thin flowing film preferably commencing at the apex of the controllably heated domed platen. This procedure enhances the ability to efficiently remove a maximum amount of volatile contaminants, such as water, with a minimum amount of heat energy.

The inventive apparatus permits the use of gravitational force to achieve the desired process flow pattern particularly in the region of the platen. Thereby, the amount of lubricating oil pumping capacity and pumping pressure required for a vehicular oil pump of the type needed for use in utilizing the reconditioning system of this invention is reduced to a level comparable to that used for an oil pump in a conventional engine lubricating oil recirculation system.

The inventive process and apparatus are functionally associatable with an existing engine with a minimum amount of equipment alteration and with a minimum amount of labor and without redesigning the oil lubricating system of the engine.

By regulating the flow of oil onto a centermost portion of a domed platen, any brief tilt of the unit or briefly applied centrifugal or inertial force, such as occurs in normal vehicular use, does not substantially disrupt the thin film or the oil dwell time on the platens evaporation surface.

Other and further objects, aims, features, purposes, advantages, embodiments and the like will be apparent to those skilled in the art from the teachings of the present specification taken with the accompanying drawings and the appended claims.

DETAILED DESCRIPTION OF THE DRAWINGS

Figures 1, 4:
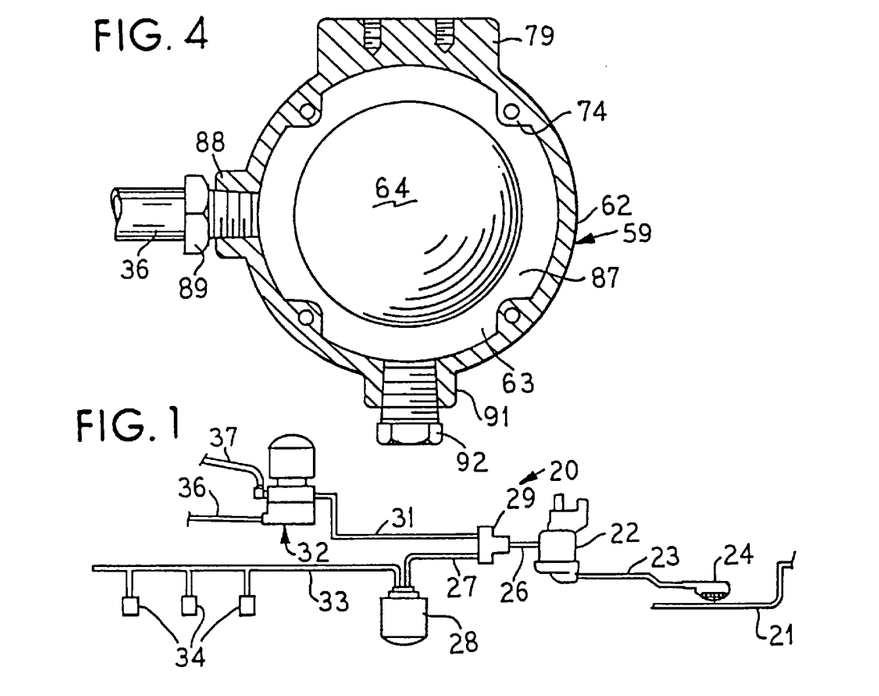
FIG. 1 is a fragmentary diagrammatic environmental view illustrating one embodiment of an oil reconditioning system of the present invention in functional association with the lubrication system of a fuel combusting engine.
FIG. 4 is a horizontal sectional view taken generally along the line IV—IV of the apparatus shown in FIG. 3.

Referring to FIG. 1, there is shown one embodiment of an engine lubricating oil reconditioning system of the present invention, such system being generally designated by the numeral 20.

In system 20, lubricating oil that has drained and collected in a conventional engine oil pan 21 is withdrawn by conventional oil pump 22 via interconnecting conduit 23 through a conventional oil screen structure 24 located in oil pan 21. From pump 22, the oil is passed as a main lubricating oil stream successively through respective conduits 26 and 27 into a conventional replaceable oil filter 28 or the like.

In filter 28, oil under partial pump 22 pressure from conduit 27 is conventionally filtered to remove filterable contaminants, such as particulates including sludge; and the filtered oil passes into a conduit system 33 through which it is conveyed to engine bearings 34 for conventional lubrication purposes. From the bearings 34, the oil drains down (not detailed in FIG. 1) and is again collected in the oil pan 21 for recycling through pump 22.

Conduits 26 and 27 are connected together through a by-pass valve or proportional flow divider 29 which divides the oil entering from conduit 26 into two streams, a main oil stream in conduit 27 comprising more than 50 volume percent of the oil that enters and flows through conduit 26 and a side oil stream in conduit 31 comprising the remaining volume percent of the oil. The side stream that enters and flows through conduit 31 feeds into an embodiment of oil the reconditioning apparatus of this invention, such embodiment being generally designated by the numeral 32.

From conduit 31, the side oil stream under partial pressure generated by pump 22 enters into oil reconditioning apparatus 32 and is processed as described herein to separate filterable contaminants as well as low boiling contaminants from the oil. The resulting processed and reconditioned oil exits from apparatus 32 through interconnecting conduit 36 and preferably passes (route not specifically detailed in FIG. 1) into oil pan 21 or the like for recycling and reuse in engine lubrication. The volatiles separated from the oil in apparatus 32 are discharged from apparatus 32 into conduit 37 and are preferably conveyed to the engine intake manifold (not detailed) or the like.

The system 20 is well suited for installation in combination with a previously manufactured vehicular engine or the like using a kit or the equivalent. Such a kit can comprise, for example, the proportional flow divider 29, the oil reconditioning apparatus 32 and the interconnecting conduit components such as conduit 31. Observe that, in the system 20 there are essentially two lubricating oil reconditioning systems, one system involving the main oil stream that is charged to conduit 27 in which the filter 28 is used for oil processing, and the second system involving the side oil stream that is charged to conduit 31 in which the apparatus 32 is used for oil processing. It is a feature of the system 20 that it can be functionally associated with a vehicular engine without redesigning the originally installed lubricating oil system. Thus, usually even the originally installed lubricating oil pump (which is commonly located in the oil pan) can be used in the system 20.

Those skilled in the art will readily also appreciate that, particularly in the case of relatively small vehicular engines, the apparatus 32 can be employed as a replacement or alternative for a conventional oil filter assembly, such as the replaceable oil filter 28 or the like.

Figure 2:
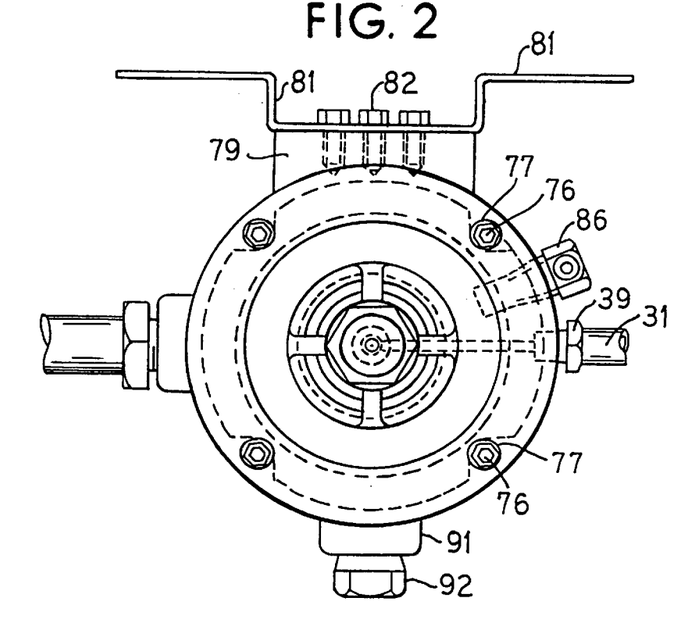
FIG. 2 is an enlarged plan view of the oil reconditioning apparatus employed in the oil reconditioning system of FIG. 1 with the oil filter assembly being shown in phantom.
Figure 3:
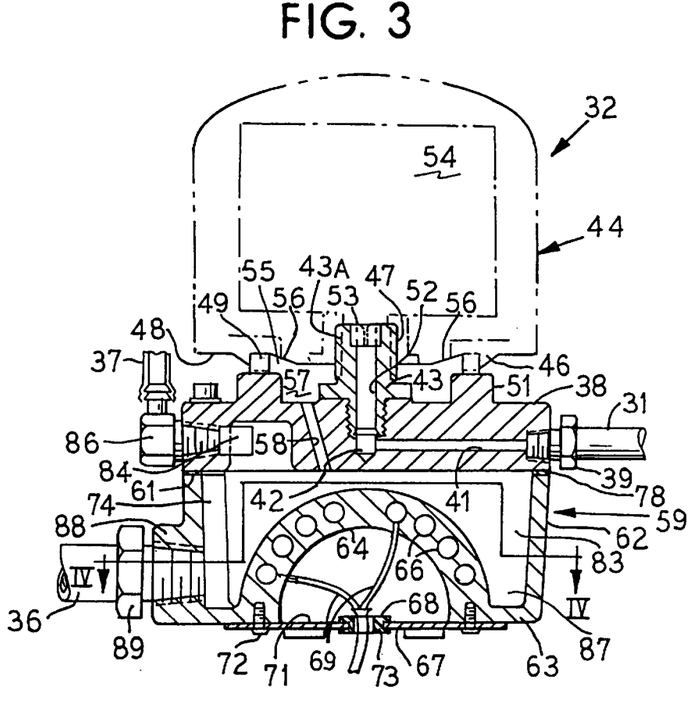
FIG. 3 is a vertical sectional view of the apparatus shown in FIG. 2 taken generally axially, but showing the oil filter assembly in phantom and showing the vapor release valve in a circumferentially displaced location relative to the oil input location for convenient representation and disclosure purposes.

Referring to FIGS. 2–4, the structure and operation of apparatus 32 is shown. Conduit 31 is connected to a circular, flattened cap block or plate 38 (see, for example, FIG. 3) that is itself conveniently comprised of a body of cast and machined metal. The connection with conduit 31 is accomplished by means of a threadably joined conventional compression fitting 39 or the like. In block 38, the oil entering from conduit 31 passes generally radially in a channel 41 and enters an axial passage or bore 52 that is defined in a stud 43 which is threadably connected to block 38, the stud 43 here having chambered opposite ends. The upstanding circumferential outer surfaces 43A of stud 43 are threaded and adapted to be matingly threadably engaged with the threaded axial input orifice 47 (not detailed but shown in phantom) of a canister-type replaceable oil filter assembly 44 (not detailed but shown in phantom).

In this filter, oil flows from the outside in as is conventional. (Most standard auto filters have a "check valve" that will not allow inside out flow.)

In addition, the face plate 48 of the filter 44 is provided with a conventional gasket-retaining shoulder 46 that outstands circumferentially in the face plate 48 in radially spaced relationship to the orifice 47, and a square section gasket ring 49 or the like is seated inwardly adjacent to shoulder 46 on face plate 48. The upper surface of block 38 is provided with an upstanding circular shoulder 51 that extends in radially spaced relationship to the passage 42 and whose outside upper surface is flattened. When filter 44 is threadably connected to stud 43, gasket ring 49 sealingly seats against the shoulder 51.

The axial bore 52 in stud 43 whose outer (oil entering) end is optionally but preferably fitted with an inset metering jet 53. Thus, pressurized oil from passage 42 enters bore 52 at a regulated pressure and flow rate and is discharged (preferably sprayed) into the filter 44.

After passing through the filter medium 54 (not detailed, but shown in phantom) in filter 44, the filtered oil exits the filter 44 through its exit ports 56, passes through a cavity 55 and deposits upon and in a shallow, flat bottomed well 57 defined in the top of block 38 between stud 43 and shoulder 51. A plurality of circumferentially spaced, diagonally downwardly and inwardly extending channels 58 (four are shown for illustrative purposes) extend from the bottom of well 57 through the block 38. The channels 58 are thus adapted for the passage of oil therethrough from well 57.

The peripheral bottom facial surface regions of the block 38 are flattened and adapted for face-to-face engagement with the upper, circumferentially extending rim edge 61 of a housing 59 that is itself conveniently comprised of a body of cast and machined metal. Housing 59 is shown preferably as a one-piece structure having in axial vertical section a generally W-shaped configuration. The outside wall 62 of housing 59 upwardly extends circumferentially and terminates in the rim edge 61. Between, and joined to, the bottom regions of wall 62 at a cross-over region 63 is a hemispherically shaped thickened dome 64. Within the dome 64 is cast a conventional type of spirally extending, electrically energizable, electrically insulated, resistance heated wire-like conductor or heater 66.

Mounted across the bottom opening mouth 71 of the dome 64 by means of button head cap screws 72 or the like that are threadably received in the adjacent portions of the dome 64 is a flattened cover plate 67. A center hole 73 in plate 67 is conveniently provided with a conventional army-navy type rubber grommet 68. Through the center hole of the grommet 68 lead wires 69 interconnect with respective opposite ends of the spirally extending heater 66. When the apparatus 32 is being employed with a vehicular engine, the heater 66 can be selected so as to be operated by a 12-volt energy source (such as a conventional vehicular battery) with the wattage being determined by such variables as the type of heater 66 employed, the type of temperature control utilized and the like. Various types of conventional temperature control means can be used with a present preference being a temperature switch attached to the bottom surface of dome 64. The switch cuts the current to the heater at a predetermined upper limit and thereafter cycles the heater on and off to maintain the desired vaporization heat. The operating temperature for the heater 66 can be as desired. However, a present preference for use with the apparatus 32 when associated with a conventional internal combustion engine is about 180–190° F.

To connect the housing 59 with the block 38, a plurality of (for example, four) circumferentially spaced, transverse bores (not detailed) are provided about the perimeter of plate 59 which are each aligned with a plurality of corresponding circumferentially spaced, thickened wall portions 74 in the housing wall 62. A cap screw 76 with an associated lock washer 77, or the like extends through each plate 38 bore and is threadably received in a mating bore (not detailed) in each thickened wall portion 74. To achieve a seal between the block 38 and the housing 59, a flat gasket 78 is interposed therebetween.

To mount the apparatus 32 to a surface, such as a vehicular firewall or the like (not detailed), the housing wall 62 is provided with a side projection 79 to which is affixed a mounting bracket 81 that is held to the projection 79 by means of hex-headed bolts 82 or the like.

In operation, freshly filtered oil (not shown) from filter 44 passes down through the channels 58, deposits upon the central upper outer surface region of the heated dome 64, spreads and forms a thin film upon the heated surface of the dome 64. Volatiles, such as water, are rapidly boiled away or flashed from the oil film and enter into the gas space of the chamber 83 that is defined by the walls 62, the dome 64 and the plate 38. When the gas (vapor) pressure in the chamber 83 reaches some predetermined value, a normally closed pressure relief valve 84 or the like automatically opens, thereby relieving the pressure in the chamber 83. When the pressure within chamber 83 drops to some predetermined lower value, the relief valve 84 automatically closes, thereby returning the chamber 83 to its normally isolated state.

The relief valve 84 is functionally connected to the conduit 37 using a compression fitting 86 or the like which, as indicated above, is in turn connected to the engine intake manifold (not shown). Thus, vapors released from the chamber 83 are not released directly to the atmosphere, but are injected into the heated manifold where combustion (oxidation) of combustible (oxidizable) components in the released vapors can occur (as is desirable for pollution control and abatement purposes).

The oil on and from the surface of the dome 64 flows downwards by gravity and collects in a flat bottomed sump 87 between the bottom regions of wall 62 and dome 64 over cross-over region 63. Oil in sump 87 is withdrawn through conduit 36 which is threadably connected though an aperture defined in a thickened portion 88 of wall 62 which aperture is connected to the conduit 36 by means of a threaded compression fitting 89.

The housing 59 is also preferably provided (see FIG. 4) with another thickened portion 91 that is provided with a threaded aperture (not detailed) which is fitted with a threadably engaging plug 92 for purposes of optionally changing the location of fitting 89 and conduit 36 to achieve a direct routing back to the oil pan 21 in a particular application of apparatus 32.

While the dome 64 (as shown) is preferably generally hemispherical in configuration, those skilled in the art will appreciate that other spherical segment configurations can be employed for the dome 64 (such as parabolic shapes, elliptical shapes, conical shapes and the like) and also that, broadly, any convexly curved or vertically centrally up-raised upper surface can be employed in the dome 64. The filtered oil is preferably deposited in the region of maximum upward projection of the dome 64 upper surface so that the flow path downwards (by gravity) of the oil comprising the thin film on the dome upper surface is of maximum length for achieving the preferred heat exposure to a thin film.

Both the heating of the dome and the rate of oil film flow over the dome surface should preferably be relatively uniform with relatively "hot" or "cold" spots on the dome being avoided and with dome localized surface irregularities being avoided which could cause localized variations in oil film flow rate (and oil exposure time).

While some residual pressurization of oil being processed in apparatus 32 is maintained during residence of oil in apparatus 32, the force of gravity in accomplishing the desired oil flow characteristics plays an important role in the operation of apparatus 32.

In normal operation, the oil pressure existing in, for example, the conduits 33 and 31 of system 20 is predictable and has a reliable value (over a set range) since the oil pump 22 of a given engine operates at about a constant pressure by engineering design. Also, in normal operation of a given engine, the pressure existing in the manifold falls within a predictable range, the exact pressure at any given instant being dependent upon such operating variables as engine rpm (revolutions per minute) engine load, rate and extent of fuel consumption, engine operating temperature and the like. Typically, the bulk average temperature of the oil in an operating internal combustion engine is below 212° F. (100° C.) at atmospheric environmental conditions. Thus, the flow rate of oil through apparatus 32 can be adjusted by a proportional flow divider 29 so that, during normal operating conditions, the oil level in sump 87 is sufficient to cover the aperture in thickened portion 89 leading to the conduit 36. Thereby, an operating condition is avoided in which this oil level is below the top aperture so that gas in chamber 83 can vent through conduit 36.

Typically, in normal operation, the release gas pressure for valve 84 is set to be substantially above the oil fluid pressure normally existing in conduit 31. Thus, liquid oil enters into line 36 from sump 87 at any given time by a resultant combined pressure comprised of pressure in conduit 31, gravitational force and gas pressure in chamber 83. The release pressure for valve 84 is preferably chosen so as to be above the average manifold pressure so that, when valve 84 is open, manifold gases do not vent through conduit 37 back into chamber 83. The gas pressure in chamber 83 thus aids in recirculating oil from apparatus 32.

Figure 5:
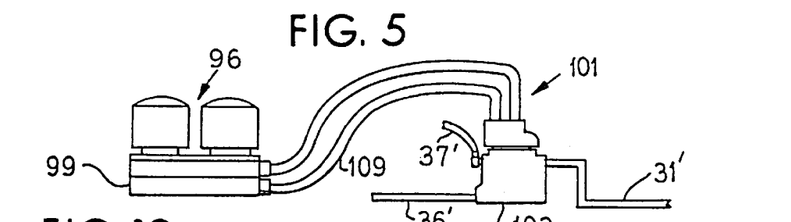
FIG. 5 is a view similar to FIG. 1 but showing an alternative embodiment of an oil reconditioning system of the present invention shown in fragmentary functional association with the lubrication system of a fuel combusting engine.
Figure 6:
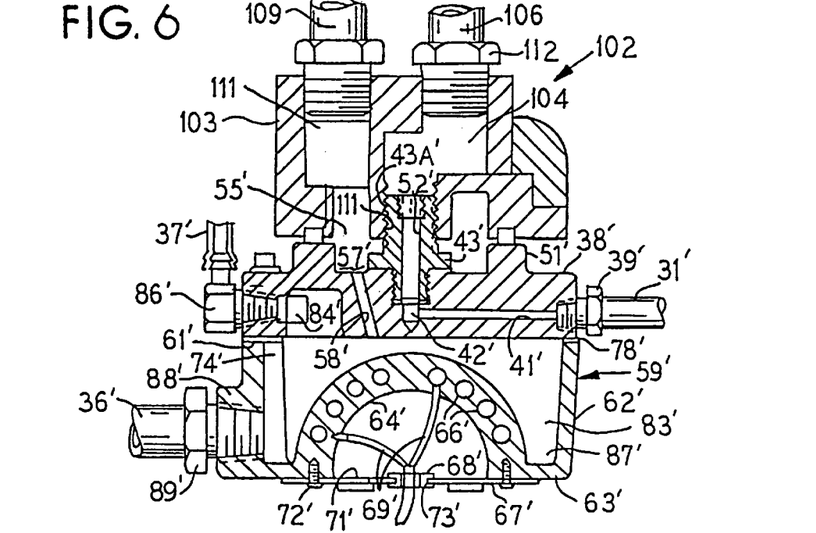
FIG. 6 is a vertical sectional view similar to FIG. 3, but showing the dome platen and its associated housing in further association with an alternative head plate, the resulting apparatus combination being adapted for use in the system embodiment of FIG. 5.
Figure 7:
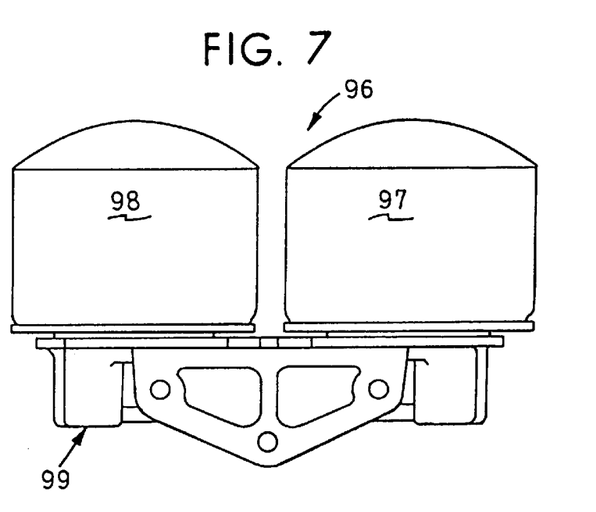
FIG. 7 is a side elevational view of an alternative filter assembly for association with the embodiment of FIG. 5; and the apparatus of FIG. 6.
Figure 8:
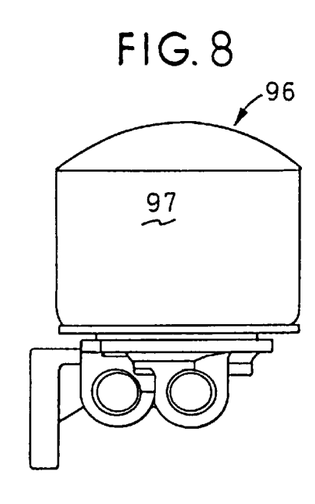
FIG. 8 is an end elevational view of the alternative filter assembly shown in FIG. 7.
Figure 9:
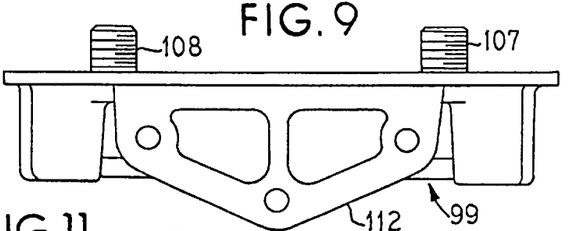
FIG. 9 is a view similar to FIG. 7, but with both of the canister-type filters removed.

For purposes of enhancing the filtering of oil prior to the thin film flashing on the platen dome, particularly when the lubricating oil of a relatively large size engine is being reconditioned in accord with the present invention, filter subassemblies of large filtering capacity are preferred. For example, in the oil reconditioning apparatus 32, the single oil filter 44 can be replaced by a filter assembly 96 such as shown in FIGS. 7 and 8 that incorporates a pair of oil filters 97 and 98 (also conveniently both being of the same structure as the replaceable spin-on, canister-type filter 44). The assembly 96 is incorporated into an alternative system such as shown in FIG. 5 that is designated by the numeral 101 which utilizes the alternative apparatus such as shown in FIG. 6 that is designated by the number 102. Components in FIGS. 5 and 6 that correspond to components in FIGS. 1–4 are similarly numbered but with the addition of prime marks thereto for convenient identification purposes.

In system 101, lubricating oil that has drained and collected as in FIG. 1 in a conventional engine oil pan (not shown) is withdrawn by a conventional oil pump (not shown) and enters interconnecting conduit 31' as shown in FIG. 1.

Oil in conduit 31' is delivered to apparatus 102 as shown in FIG. 5. Apparatus 102 is here generally the same as shown in FIG. 3 but is further associated with a cooperating adapter plate 103.

Oil in conduit 31' enters plate (or block) 38', as shown in FIG. 5, passes through channel 41' through bore 52' and into channel 104 in plate 103.

The lower face of plate 103 is threadedly associated at aperture 111 with outer circumferential threads 43A' of stud 43'. A compression fitting 112 threadably engages plate 103 at the mouth of channel or bore 104 so than an associated conduit 106 receives the entering oil from conduit 31' and conveys this oil to filter assembly 96. The base of assembly 96 comprises a manifold structure 99 that is preferably comprised of cast and machined metal. In manifold structure 99, channel means is provided by which the input oil from conduit 106 is fed in separate streams to the filters 97 and 98. One such stream is fed through each of two threaded studs 107 and 108 upstanding from manifold structure 99 into the filters 97 and 98 that are associated therewith. Oil entering each filter 97 and 98 is filtered and then drains down from each filter first into a collection sump 113 that is similar in function to sump 87. From each such sump, the filtered oil is collected and enters into return conduit 109 through which the filtered oil is returned to the mouth of the input bore 111 of plate 103. Conduit 109 is here threadably connected to the mouth of aperture or bore 111 by a compression fitting 114. In bore 111, the filtered input oil drains down through the channels 58' onto the central region of heated dome 64' thereby forming a thin film of oil from which volatiles are separated.

The manifold structure 99 is formed with an integral bracket structure 112 which enables the assembled oil filter assembly 96 to be mounted to a firewall or the like in a vehicle (not shown) adjacent to the apparatus 102.

Figure 10:
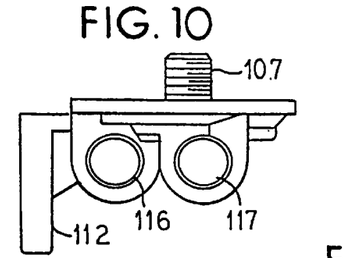
FIG. 10 is a view similar to FIG. 8 but with both of the canister-type filters removed.
Figure 11:
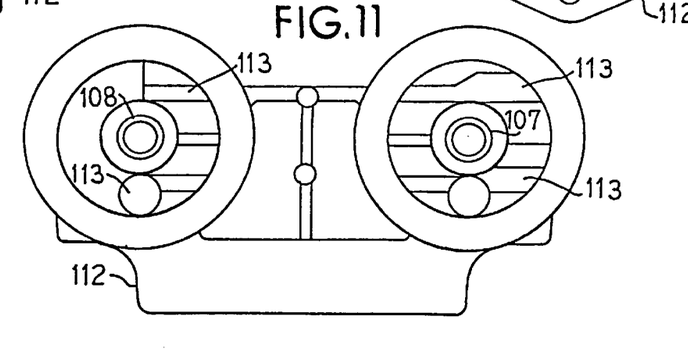
FIG. 11 is a top plan view of the structure shown in FIG. 9.

For ease in use, each opposing end of the manifold 99 is provided with an input port 116 and an output port 117 (see FIG. 10) for ease of use in connecting manifold 99 with conduits 106 and 109. Only one pair of ports 116 and 117 is used in a given installation with each of the non-used ports being closed by a threaded plug (not detailed).

In the practice of the process of the present invention, it is found to be desirable and preferably for oil that is being reconditioned to be filtered to an extent sufficient to separate therefrom substantially all particulates above a particle size in the range of about 1 to about 5 microns. Since conventional typical full-flow oil filters are understood to remove particulates above about 40 microns, and since conventional typical by-pass oil filters are understood to remove particulates above about 10 to about 15 microns, conventional vehicular oil filters are not used for achieving such preferred filtration. Also, conventionally used oil flow rates through oil filters are typically understood to be above about 20 gallons per hour which is believed to be excessive for purposes of achieving particulate filtering down to a particle size in the range of about 1 to about 5 microns. For such preferred purposes, oil flow rates through an oil reconditioning system of this invention in the range of about 4 to about 10 gallons per hour are presently preferred. Higher flow rates do not result in the desired filtration of all particles larger than about 5 microns while lower flow rates apparently not only appear to be impractical, but also appear to interfere with the achievement of desirable residence times for oil flowing as a thin film upon surface portions of a domed platen in the platen assembly.

Oil flow rates in the range of about 4 to about 10 gallons per hour are believed to be best when associated with average oil pressures that are preferably in the range of about 20 to about 110 psi and more preferably in the range of about 25 to about 100 psi. Higher oil pressures are believed to be generally undesirable since they usually require use of a pressure reducing valve and can lead to pressure problems in the platen assembly, such as in the chamber over the platen. Lower oil pressures are generally impractical for usage in a system of this invention.

As those skilled in the art will readily appreciate, various filter structures are known and are available commercially which will function to filter engine oil to remove therefrom particles down to the desired particle size of about 1 to about 5 microns. One presently preferred filter structure is available commercially from Parker Hannifin Corp., Raycore Div., Modesto, Calif. as its filter assembly Model No. LFS-801 or LFS-802. As shown, illustratively, for example, in FIGS. 12–14, such a filter assembly structure 121 incorporates a relatively large housing body 122 with elongated, generally cylindrically configured sides 123 and with an integrally formed closed terminal end 124. The body 122 is comprised of a cast metal, such as an aluminum alloy or the like. The opposite or open end 124 of body 122 is flared and is interiorly circumferentially threaded for mating engagement with a exteriorly circumferentially threaded cap 126. Locations on diametrically opposite sides of the cap 126 each have pivotably mounted thereto a different one of a pair of projecting legs 127 of a flattened U-shaped bracket 128 by means of adjustable bolt assemblies 129. The bracket 128 has a leg interconnecting flattened base 131 which provides a surface that is suitable for mounting the filter assembly 121 to a firewall or the like in an engine compartment of a vehicle.

Figures 12, 13:
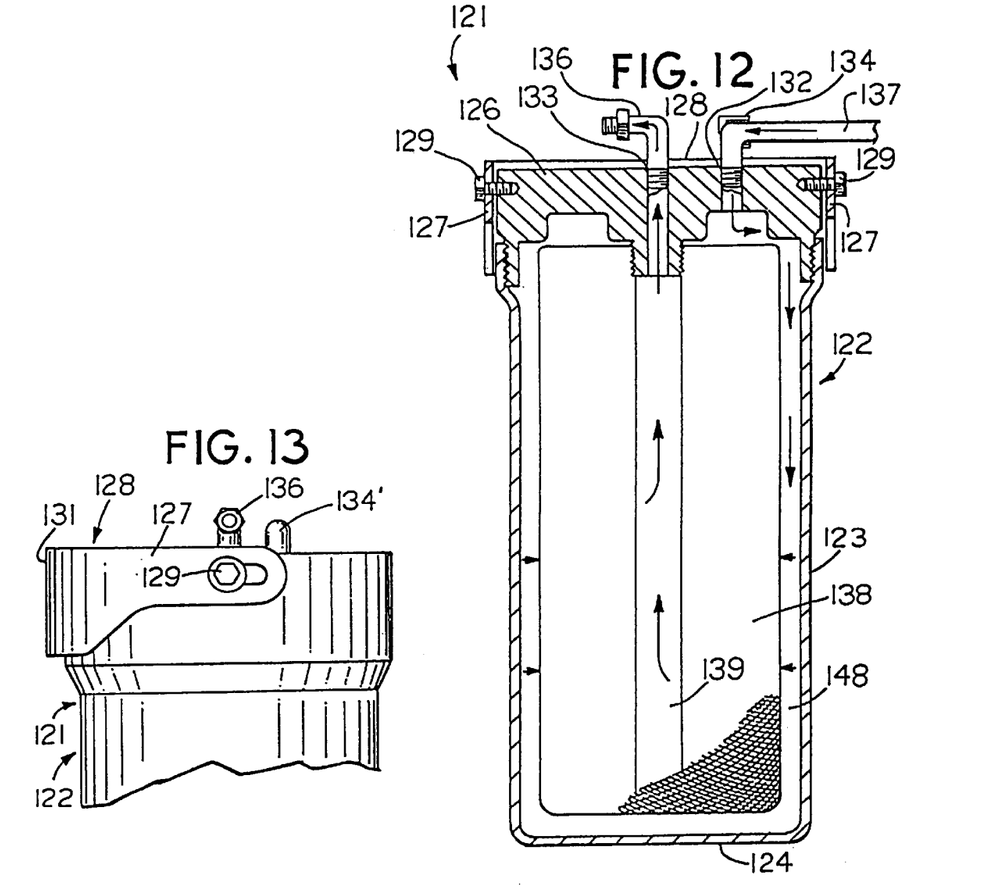
FIG. 12 is an axial sectional view through a preferred embodiment of an alternative filter assembly adapted for use in this invention a portion of the bottom exterior of the replacable filter element or cartridge being shown.
FIG. 13 is a fragmentary side elevational view of the exterior upper portion of the filter assembly of FIG. 12 including the mounting bracket, the filter assembly being turned clockwise 90° relative to the orientation shown in FIG. 12.

The cap 126 is additionally provided with an oil input orifice 132 and an oil output orifice 133 as shown illustratively in FIG. 12. The input orifice 132 is directly and exteriorly connected to a metering jet 134 that is threadably associated with the oil input orifice 132. The output orifice 133 connects threadably with an elbow 136 that is associated with a conduct 137 (which corresponds to the conduit 31 in FIG. 1) that conveys filtered oil from the filter assembly structure 121 to the vaporizer or platen assembly 102 (see, for example, FIG. 6). The filter assembly structure 121 thus is adapted to replace the two-component filter assembly 96 as shown in FIG. 5 and FIGS. 9–11.

The filter element 138 of the filter assembly structure 121 is generally cylindrically configured with an axial channel 139 extending therethrough. The filter element 138 is preferably comprised of a computer-controlled winding of cotton thread or roving, or the like. Owing to progressive and computer directed changes in weave and in tension of overlapping roving, the wound layers of roving become progressively more porous with increasing radial distance from the axial or core channel 139 of the filter element 138. Thus, the wound roving in a layer-like region 141 that is adjacent to the axially extending channel 139 of the filter element 138 is characterized by a capacity to pass therethrough particles having a particle size that is less than about 5 microns.

Figure 14:
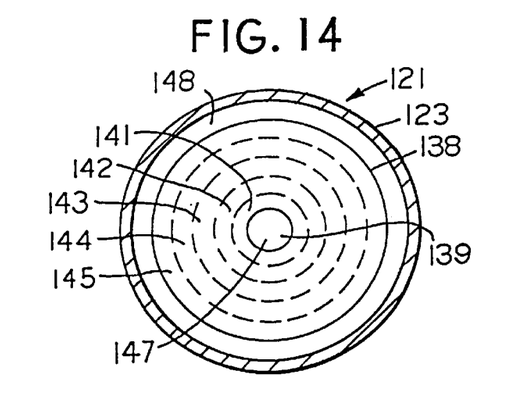
FIG. 14 is a diametrical and diagrammatic sectional view taken across a mid-region of the filter assembly of FIG. 12.

From one to four or even more additional radially adjacent layer-like regions or stages are successively and adjacently formed over the innermost axially adjacent layer such as layer-like regions 142, 143, 144 and 145 of filter element 138 as illustratively shown in the cross-sectional diagrammatic view shown in FIG. 14. Each successive one of the layer-like regions 142, 143, 144 and 145, as the distance from the filter element core channel 139 increases, is wound so that it removes particles that are larger than those which are passable through the next adjacent radially inner layer.

For example, suitable and illustrative four and five layered and progressive filter elements, such as filter element 138, proceeding from largest filterable particles radially inwards to the axial channel 139 can be utilized to remove particles. Illustrative progressive reductions in particle sizes removed as oil flows radially inwardly from the outer surface of filter element 138 inwards to the axial channel 139 for several representative filter elements 138 are shown in Table I below.

TABLE I

Filter Element Stages

| STAGE LAYER NO. FROM | FILTER ELEMENT REMOVES PARTICLES IN SPECIFIED STAGE LAYER DOWN TO SPECIFIED APPROXIMATE SIZE MICRON RANGE | | |
| --- | --- | --- | --- |
| OUTSIDE IN | 3 stage layer | 4 stage layer | 5 stage layer |
| 1 | about 15 to about 30 | about 15 to about 30 | about 35 to about 40 |
| 2 | about 8 to about 12 | about 8 to about 15 | about 20 to about 35 |
| 3 | about 1 to about 3 | about 8 to about 15* | about 10 to about 20 |
| 4 | | about 1 to about 5 | about 5 to about 10 |
| 5 | | | about 1 to about 5 |

The filter element 138 is inserted into the body 122. The lower end of the axial channel 139 seats over a dimple 147 formed centrally in closed end 124. As so seated, a circumferential spacing 148 exists between outer circumferential surface portions of the filter element 138, and inside surface portions of the cylindrical sides 123. The upper end of the filter element 138 is received restably and matingly into interior portions of the cap 126 so that, when the cap 126 is threadably fully engaged with flared upper end portions of the cylindrical sides 123, the upper end of this filter element 138 is sealingly and abuttingly engaged with adjacent surface portions of the cap 126.

The input orifice in cap 126 connects with the circumferential spacing 148 and the output orifice connects with the axial channel 139. As indicated by the arrows provided in FIG. 12, oil input through input orifice 132 enters into the circumferential spacing 148, flows radially through the filter element 138, enters into the axial channel 139 and is output through the output orifice 133.

The preferred oil flow rates and oil pressures (indicated above) can be achieved for oil being charged to a suitable oil filter element in filter assembly structure 121 by threadably (or otherwise) associating a suitable conventional metering orifice (or so called "metering jet") 134 with the cap 126 input orifice 132 and threadably associating the outside end portion of the jet 134 with the conduit 137 that delivers the oil to the metering jet 134. The orifice size of such a metering jet 134 can vary, depending upon such variables as the oil pressure associated with the output stream from the associated engine oil pump and/or the total volume or flow rate of engine oil being pumped by the associated engine oil pump. For typical engine sizes, a metering jet 134 orifice diameter size in the range of about 0.025 to about 0.04 inch appears to be suitable with a metering orifice diameter size of about 0.031 inch apparently being a generally useful size and therefore is presently preferred.

One of the desirable characteristics of such a progressively staged filter element 138 is that it eliminates the effect known as "plugging" or "loading", such as occurs with a corresponding prior art filter element having only a single range of particle filtering capacity. As soon as outer porous portions of that type of filter element become contaminated or filled with particles, the filter element becomes ineffective for filtering further particles.

Another desirable characteristic of such a progressively staged filter element 138 is that it eliminates the effect known as "channeling" where oil under pressure in a filter tends to seek and follow paths of least resistance. Such paths are associated with little or no filtering.

It is believed that charging to the platen assembly a filtered oil feed stock wherein the particle size is not above about 5 microns results in surprisingly better removal of volatiles from the oil being reconditioned in the inventive system compared to a comparable oil feedstock is filtered with conventional oil filters of the types such as above indicated.

It is preferred for a filter assembly structure 121 to have a relatively large volume and a relatively large filter element 138. Thus the oil flow rate and pressure measured at each of the respective input and output locations of the filter can fall into the respective ranges above indicated. However, in the filter assembly structure 121, oil flow rate and oil pressure are reduced owing to the structure 121 volume and the size of filter element 138, thereby to enhance the effectiveness of the oil filtering and effectuate desired removal of particulates. Because of the size and the performance characteristics of such a filter assembly structure 121, separate but preferably adjacently located respective housings for the filter assembly and the platen assembly, as illustrated for example, in FIGS. 15 and 16 are presently desirable.

Platen assembly apparatus variables, such as, for example, the domed configured platen size or configuration, or the size of the chamber over the platen, are somewhat limited by the practical considerations of available space in an engine compartment, as those skilled in the art will readily appreciate. It is presently convenient and preferred to employ a platen which is symmetrically configured relative to a vertically extending axis. Preferably, the platen has a diameter that is in the range of about 3 to about 9 inches although various platen configurations and sizes can be employed.

Figure 15:
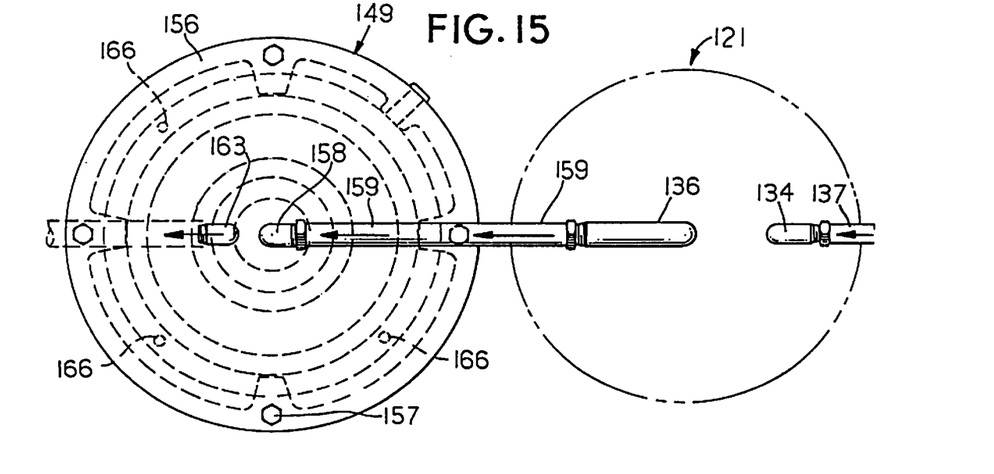
FIG. 15 is a plan view of an alternative embodiment of oil reconditioning (or platen assembly) apparatus employed in the oil reconditioning system of FIG. 1, the present apparatus being alternatively used in place of the apparatus of FIGS. 2–4, and in combination with the oil filter assembly of FIGS. 12–14, this oil filter assembly being shown in phantom.
Figure 16:
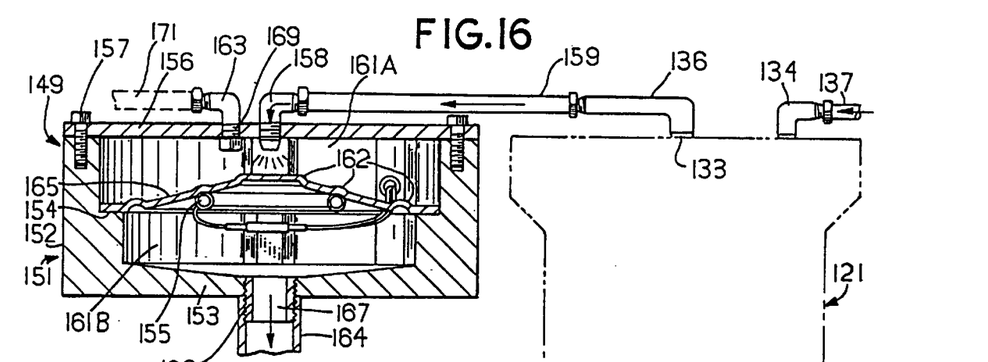
FIG. 16 is a vertical sectional view of the apparatus shown in FIG. 15 taken generally axially through the platen assembly, but with the oil filter assembly being shown in phantom.
Figure 17:
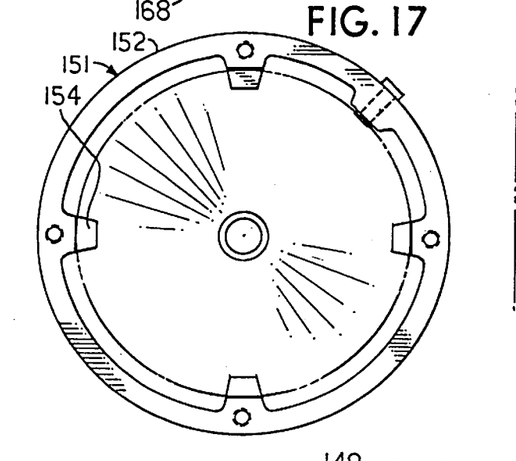
FIG. 17 is a top plan view of the platen assembly housing with the platen and the cover plate removed.

An alternative embodiment of a platen assembly 149 that is now believed to be well suited for use with functional combination with a filter assembly structure 121 in the practice of this invention is illustrated in FIGS. 15 and 16. A filter assembly structure 121 is shown in phantom in FIGS. 15 and 16. The platen assembly 149 incorporates a preferably and generally cylindrically configured housing 151 that includes a cylindrically configured outside side wall 152 and an integrally formed bottom platform 153 that extends diametrically across the lower end of side wall 152. An interior shoulder 154 circumferentially extends around the inside of the side wall 152 and defines an interior edge surface upon which perimeter adjacent portions of a domed platen 165 can seat and thereby support the platen 165 in upwardly spaced relationship relative to the bottom platform 153. Machine screws or the like (not detailed) mount the platen 154 edge portions to the edge of the shoulder 154.

The domed platen 154 is here illustratively but preferably comprised of a formed steel plate, the forming being accomplished by die pressing or the like. The under surface of this platen 154 has fixed thereto by adhesive or the like (not detailed) by a conventional thermostatically controlled electrical element 155. The thermostatic control can be variously located; for example it can be located in chamber 161B adjacent to the side wall 152.

In effect, the platen 154 divides the housing 151 into an upper chamber 161A and a lower chamber 161B. A circularly sided cover plate 156 extends across and rests against the upper end portions of the side wall 152. A plurality of circumferentially spaced, hex-headed machine bolts 157 or the like extend through perimeter portions of plate 56 and threadably matingly engage threaded sockets formed in the upper end portions of the sidewall 152. A sealing gasket (not shown) may be positioned between the upper end portions of the side wall 152 and the plate 156.

A central (preferably axial) bore through plate 156 is here threadably engaged with a metering jet 158. A conduit 159 interconnects the metering jet 158 with the elbow 136 associated with filter assembly structure 121 so that filtered oil from the output orifice 133 of the filter assembly structure 121 is conveyed to and input into the upper central portion of the platen assembly 149. The metering jet 158 is preferably adapted to output therefrom all the oil fed thereinto and therethrough as a spray which is discharged into the chamber 161 in housing 151 preferably over the apex of the platen 165. The entering oil is fed downwardly in upper chamber 161 preferably axially (relative to platen assembly 149) from the end or terminal nozzle of the metering jet 158. The oil spray need not but preferably does has a conical pattern that is aligned with the central (preferably axial) apex region of the domed platen 165. Spray charging in a conically shaped pattern such as shown in FIG. 16 is believed to enhance and maximize the surface area of the filtered oil charged into the platen chamber 161A. At present, it is convenient and preferred for the diameter of the spray cone base at the location where the cone base reaches the platen 165 surface to be less than about 3 inches, but other such diameters can be used. if desired.

Oil entering the chamber 161 from metering jet 158 is preferably deposited on the upper surface of the apex region of the domed platen 154 and forms a thin film (not shown) on platen 154 which flows by gravity downwardly and outwardly over upper surface portions of the platen 165 upper surfaces to the lower outer terminal peripheral side regions of the platen 165. From there, the oil flows through a plurality of circumferentially spaced apertures 166 in peripheral side regions of the platen 165 adjacent to the shoulder 154 and moves into lower chamber 161B. In chamber 161B, the oil flows by gravity downwards onto the interior upper surfaces of the bottom platform 153 which surfaces are conically tapered so that the oil flows to a central (preferably axial) exit port 167. A connecting sleeve 168 of the like is threadably associated with port 167 and external portions of the sleeve 168 are threadably connected with a conduit 164. Various arrangements can be used to join the exit port 167 with to conduit 164, as those skilled in the art will appreciate. The conduit 164 conveys the reconditioned oil back to the associated engine; a present preference being to charge this oil into the oil pan of the engine (not detailed).

Although the platen 165 in the platen assembly 149 is preferably uniformly heated to a selected temperature in the range of about 180° to about 190° F. during operation, platen temperatures generally in the range of about 160° to about 200° F. are believed to be effective and useful in separating volatiles from contaminated entering oil. The chamber 161A over the platen 165, which for convenience can be termed herein the platen chamber, is itself heated by the adjacent platen 165. However, if desired, the side wall 152 and the bottom platform 153 can be heated, preferably electrically (not shown).

One preferred configuration for the domed platen 165, as above indicated, is spherical, more preferably hemispherical.

However, in the practice of the presently preferred process of this invention, and particularly when a staged filter assembly is being employed for oil filtering as above described, the domed platen 165 can incorporate certain modifications. For example, the domed platen 165 can advantageously incorporate a plurality of radially spaced, concentric, ridge-like elevations 162 upon and in its upper surface portions. Each elevation 162 has a small height relative to radially adjacent upper higher surface portions. Thus, a thin film of oil flowing radially downwardly over the platen 165 upper surfaces preferably experiences at least two cycles of alternately being thickened and thinned before reaching the lower outer perimeter of the platen 165. The ridge-like elevations 162 are believe to enhance oil reconditioning by functioning to increase the opportunities for volatiles to be separated from oil being reconditioned while the oil is in contacting relationship with the platen 165 as a thin film.

Under the normal range of operating conditions of an associated internal combustion engine, it is convenient to continuously return separated volatiles from the platen chamber 161A to the manifold of the associated engine from a volatiles outlet 169 that is preferably located in an upper medial portion of platen chamber 161A, here preferably in the cover plate 156. Illustratively, a bore through cover plate 156 is provided in adjacent but spaced relationship to the metering jet 158; this bore is threadably associated with an elbow 163. In turn, elbow 163 connects with a conduit 171 which preferably conveys vapors volatilized from the oil being reconditioned to the manifold of the associated engine.

To enhance separation of processed (i.e., reconditioned) oil from volatilized vapors in the chamber 161A, it is now preferred to have the processed oil that reaches the lower outside perimeter region of the platen 154 flow downwardly and diagonally to a central collection zone or sump located centrally below the platen 165 (as above described) to the return conduit 164. Such an oil collection procedure minimizes oil collection time and exposure to elevated temperatures.

During operation of the platen assembly 149 under a normal range of engine operating conditions, pressures in the platen chamber remain typically within a range and at a level which avoids volatilized vapors entering the oil return conduit 164. However, should the gas pressure in platen chamber 161A gas rise above a selected set point pressure, then a conventional vent valve (not shown in FIGS. 15 and 16) is provided that can be associated with elbow 163 and that opens to release pressure in the platen chamber 161A. When the gas pressure falls below a set point pressure, the vent valve closes.

Particularly under start up and initial (cold engine) operating conditions, and under certain other engine operating conditions and situations, when volatiles tend to collect in engine oil, the platen chamber 161A can be if desired, regulated so as to be continuously vented and maintained at ambient atmospheric pressures by means of process controls (conventional, not detailed) that are associated with the vent valve, thereby to maintain the platen chamber 161A at ambient (atmospheric) pressure at such operating conditions. By maintaining atmospheric pressure in the platen chamber 161A, a maximum pressure differential is achieved between the pressure of oil entering the platen chamber 161A and the platen chamber 161A pressure. Such a maximized pressure differential is believed to enhance and maximize the removal of volatiles from oil being processed in the platen assembly.

The filtered oil that enters the platen assembly 149 from the filter assembly 121 is first charged into the platen chamber 161A. The location of oil charging or entry into chamber 161A is preferably above and in vertically spaced relationship to the upper central apex surface region of the doomed platen 165. Since, as above indicated, the entering filtered oil is preferably and typically pressurized to a pressure that is in the range of about 25 to about 100 psig as charged to the platen chamber 161A, this so-charged oil experiences an immediate pressure drop upon entry into chamber 161A. Resultingly, at least some of the volatiles in the entering filtered oil are believed to be immediately evaporated or vaporized therefrom in the platen chamber 161A. Thus, the vaporization occurs both before and during contract of the filtered oil as a thin film with the platen 165 surface regions in chamber 161A.

The platen assembly 149, as those skilled in the art will readily appreciate, can be variously configured. The total volume of the platen chamber 161A and the spacing in the platen chamber 161A between the nearest location(s) of entry of the filtered oil into chamber 161A over the upper central apex surface region of the platen 165 can be fixed and selected before or during the fabrication of the platen assembly 149. At present, in the platen chamber 161A, a spacing distance between the location of entry of filtered oil and the upper central surface apex region of the platen 165 is preferably and conveniently in the range of about 0.5 to about 1 inch, but other spacing distances can be used, if desired.

As above indicated, to enhance removal of volatiles from filtered oil in the platen chamber, it is now preferred to charge the filtered oil to the platen chamber as a spray.

Other and further equivalent embodiments and variations will be apparent to those skilled in the art without departing from the spirit and scope of this invention.

What is claimed is:

1. A process for reconditioning oil comprising the steps of continuously and sequentially;
    a. charging contaminated oil at a flow rate in the range of about 4 to about 10 gallons per hour and at a pressure in the range of about 20 to 100 psi to a filter zone;
    b. filtering said contaminated oil in said filter zone to separate therefrom particulates having particle sizes over about 1 to about 5 microns;
    c. depositing said filtered oil upon an upper central surface region of a generally dome-configured platen so that a thin film of said filtered oil is formed on said platen and flows generally radially outwardly and downwardly over surfaces of said platen while said platen is heated to a temperature in the range of about 160 to about 200° F. so that volatiles are separated from said thin film; and
    d. collecting said separated volatiles in a chamber existing over said platen surfaces but under said filter zone while concurrently collecting oil from said thin film from lower peripheral regions of said platen.

2. The process of claim 1 wherein said platen is symmetrical relative to a vertically extending axis that extends therethrough and wherein said platen has a dome diameter in the range of about 3 to 9 inches.

3. The process of claim 1 wherein said collected oil is continuously returned to an operating internal combustion engine for reuse in engine lubrication.

4. The process of claim 1 wherein said collected volatiles are vented from said chamber whenever the gas pressure in said chamber exceeds a preset value.

5. The process of claim 1 wherein said collected volatiles are conveyed from said chamber to the intake manifold of an operating internal combustion engine.

6. The process of claim 1 wherein said chamber is vented to the atmosphere and wherein said filtered oil, before being so deposited upon said upper central surface region, is charged into said chamber at a location which is generally above and in vertically spaced relationship to said upper central surface region, and said chamber is concurrently maintained at said temperature so that said filtered oil upon being so charged experiences an immediate pressure drop whereby at least some volatiles in said filtered oil are evaporated therefrom in said chamber both before and during contact of said filtered oil with said platen surface regions.

7. The process of claim 6 wherein said filtered oil has a pressure in the range of about 25 to about 100 psig at the time of being so charged into said chamber.

8. The process of claim 6 wherein the distance between said location and said upper central surface region is in the range of about 0.5 to about 1 inch.

9. The process of claim 6 wherein said filtered oil is so charged into said chamber as a conically configured spray wherein the axis of said conical configuration generally coincides with the apex of said upper central surface region whereby the surface area of said so charged filtered oil in said chamber is maximized before said so charged oil is so deposited upon said upper central surface region.

10. The process of claim 9 wherein said dome-configured platen generally has a hemispherical configuration.

11. The process of claim 1 wherein said dome-configured platen generally has defined therein a plurality of concentric ridge-like elevations of small height relative to radially adjacent portions of said dome-configured platen whereby said film of oil, in flowing over said dome-configured platen, experiences at least two cycles of alternately being thickened and thinned before reaching the perimeter of said dome-configured platen, thereby to increase the opportunities for volatiles to be separated from said oil during residence of said oil upon said dome-configured platen.

12. The process of claim 1 wherein said dome configured platen generally has defined therein a plurality of concentric ridge-like elevations of small height relative to radially adjacent portions of said dome-configured platen whereby said film of oil, in flowing over said platen, experiences at least two cycles of alternately being thickened and thinned before reaching the perimeter of said platen, thereby to increase the opportunities for volatiles to be separated from said oil during residence of said oil upon said platen.

13. The process of claim 1 wherein said oil that is so collected along said platen peripheral regions from said thin film is preliminarily directed to flow diagonally downwardly from said platen perimeter to a central location that is generally below and generally axially located relative to said platen, thereby to minimize oil collection time.

14. The process of claim 1 wherein said filtering is carried out in a filter medium that provides three adjacent and successive stages of filtration, the filtration in the first stage removing particles from said oil down to about the 15 to 30 micron size range, the filtration in the second stage removing particles from said oil down to about the 8 to 12 micron size range, and the filtration in the third stage removing particles from said oil down to about the 1 to 3 micron range.

15. The process of claim 1 wherein said filtering is carried out in a filter medium that provides five adjacent and successive stages of filtration, the filtration in the first stage removing particles from said oil down to about the 35 to 40 micron size range, the filtration in the second stage removing particles from said oil down to about the 20 to 35 micron size range, the filtration in the third stage removing particles from said oil down to about the 10 to 20 micron range, the filtration in the fourth stage removing particles from said oil down to about the 5 to 10 micron range, and the filtration in the fifth stage removing particles from said oil down to about the 1 to 5 micron range.

16. The process of claim 1 wherein said dome-configured platen is comprised of a cast aluminum body wherein a spirally-extending, electrically energizable, electrically insulated resistance heatable wire-like conductor means is incorporated in said body.

17. The process of claim 1 wherein said dome-configured platen is comprised of a formed steel plate upon whose bottom surface portions an electrically energizable electrically insulated resistance heatable wire-like conductor means is fixed thereto.

18. The process of claim 1 wherein said platen temperature is maintained at about 180° F. to 190° F.

19. The process of claim 1 wherein said oil flow rate is maintained at about 6 gallons per hour.

20. Apparatus for removing volatiles from engine oil comprising in combination:
  (a) a housing having
    generally cylindrical sidewall portions
    a bottom plate and
    a top plate
  that together define an interior cavity;
  (b) a generally symmetrical dome configured platen mounted transversely in said cavity so as to partition said cavity into an upper chamber and a lower chamber with said generally symmetrical dome configured platen oriented upwardly and centrally in said upper chamber and including mounting means therefore, said generally symmetrical dome configured platen having apertures peripherally defined therein so that oil can flow from said generally symmetrically dome configured platen upper surface downwardly into said lower chamber;

said top plate having oil input orifice means for inputting oil upon said generally symmetrical dome configured platen;

said generally symmetrically dome configured platen having thermostatically controlled electrical heating means associated therewith;

said bottom plate having a conically progressively outwardly tapered interior surface in said lower chamber and having a central oil exit orifice means defined therethrough; and a vapor exit port means defined in said top plate, whereby oil charged into said oil input orifice means forms a thin film on said generally symmetrical dome configured platen which flows over said generally symmetrically dome configured platen upper surface portions, passes through said peripheral apertures, enters said lower chamber and flows over said conically tapered surface portions to said central oil exit orifice means.

* * * * *